(12) United States Patent
Rydh

(10) Patent No.: US 10,591,891 B2
(45) Date of Patent: Mar. 17, 2020

(54) FLUID JET CUTTING SYSTEM AND METHOD FOR CONTROLLING THE MOTION OF A FLUID JET CUTTING HEAD

(71) Applicant: Water Jet Sweden AB, Ronneby (SE)

(72) Inventor: Tony Rydh, Ronneby (SE)

(73) Assignee: Water Jet Sweden AB, Ronneby (SE)

( * ) Notice: Subject to any disclaimer, the term of this patent is extended or adjusted under 35 U.S.C. 154(b) by 0 days.

(21) Appl. No.: 15/693,050

(22) Filed: Aug. 31, 2017

(65) Prior Publication Data

US 2018/0059638 A1    Mar. 1, 2018

(30) Foreign Application Priority Data

Sep. 1, 2016   (EP) ..................................... 16186810

(51) Int. Cl.
*B24C 1/04* (2006.01)
*B26D 5/00* (2006.01)
*B26F 1/26* (2006.01)
*G05B 19/402* (2006.01)
*B26F 3/00* (2006.01)

(52) U.S. Cl.
CPC .............. *G05B 19/402* (2013.01); *B24C 1/04* (2013.01); *B24C 1/045* (2013.01); *B26D 5/005* (2013.01); *B26F 1/26* (2013.01); *B26F 3/004* (2013.01); *G05B 2219/45036* (2013.01)

(58) Field of Classification Search
CPC ........... B24C 1/04; B24C 1/045; B26D 5/005; B26F 3/004; B26F 1/26; G05B 2219/45036
USPC .......................................................... 451/2
See application file for complete search history.

(56) References Cited

U.S. PATENT DOCUMENTS 8,423,172 B2 * 4/2013 Erichsen ................. B24C 1/045
451/102
9,597,772 B2 * 3/2017 Erichsen ................. B24C 1/045
9,727,051 B2 * 8/2017 Henning ............ G05B 19/4097
(Continued)

FOREIGN PATENT DOCUMENTS

WO     03/018260 A1     3/2003
WO     2011/146884 A1   11/2011
WO     2015/112759 A1    7/2015

OTHER PUBLICATIONS

Extended European Search Report dated Mar. 8, 2017 in corresponding EP Application No. 16186810.4.

*Primary Examiner* — Eileen P Morgan
(74) *Attorney, Agent, or Firm* — Knobbe, Martens, Olson & Bear, LLP

(57) ABSTRACT

A fluid jet cutting system includes a control unit configured to control the motion of a fluid jet cutting head of the fluid jet cutting system relative a workpiece to be cut. The control unit is coupled to a fluid jet cutting head drive configured to incline the fluid jet cutting head relative a vertical line. The control unit is configured to operate the motion of the fluid jet cutting head from a predetermined inclination angle value and other operational data. The control unit is configured to automatically adapt the speed of the fluid jet cutting head in accordance with the predetermined inclination angle value. A method controls the motion of the fluid jet cutting head of the fluid jet cutting system, in which the control unit is configured to operate the motion of the fluid jet cutting head from a predetermined inclination angle value.

9 Claims, 4 Drawing Sheets

(56) References Cited

U.S. PATENT DOCUMENTS

| | | | |
|---|---|---|---|
| 2003/0037650 A1* | 2/2003 | Knaupp | B24C 1/045 |
| | | | 83/53 |
| 2003/0065424 A1* | 4/2003 | Erichsen | B24C 1/045 |
| | | | 700/281 |
| 2007/0037496 A1 | 2/2007 | Habermann et al. | |
| 2011/0287692 A1* | 11/2011 | Erichsen | B24C 1/045 |
| | | | 451/5 |
| 2013/0253687 A1* | 9/2013 | Erichsen | B24C 1/045 |
| | | | 700/118 |

* cited by examiner

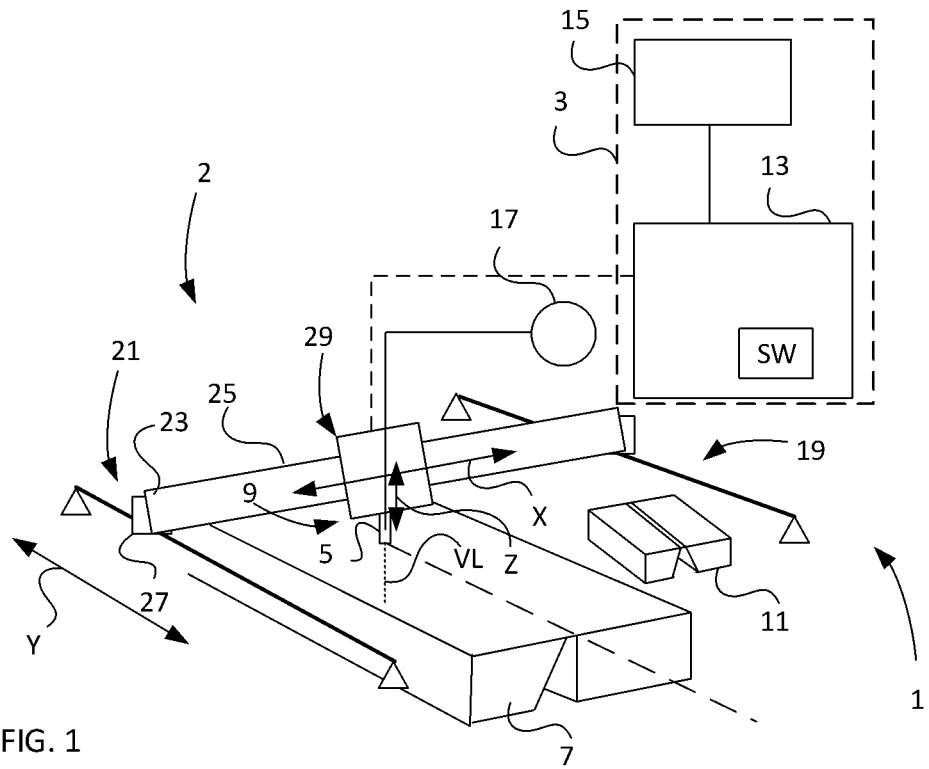
FIG. 1
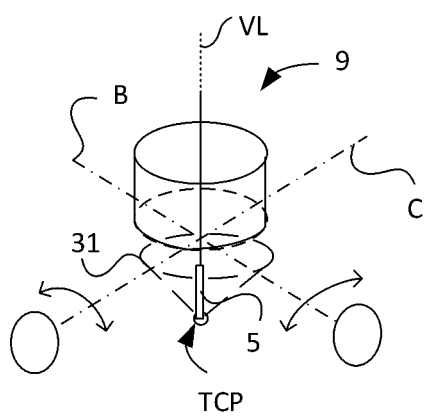
FIG. 2
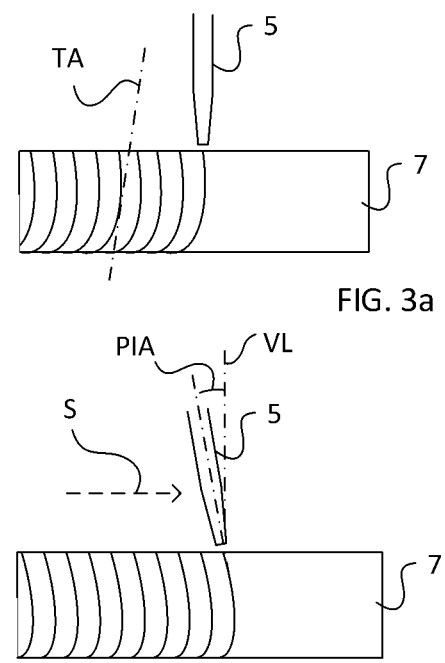
FIG. 3a
FIG. 3b

FLUID JET CUTTING SYSTEM AND METHOD FOR CONTROLLING THE MOTION OF A FLUID JET CUTTING HEAD

TECHNICAL FIELD

The present invention relates to fluid jet cutting system configured to control the motion of a fluid jet cutting head of the system relative a workpiece to be cut and relates to a method for controlling the motion of a fluid jet cutting head of said system from a predetermined inclination angle value by means of a control unit.

The present invention also relates to a data medium storing program adapted for providing a motion of a fluid jet cutting head of a fluid jet apparatus and a data medium storing program product for performing said method steps.

A water jet cutting machine of a fluid jet cutting system is an industrial tool using ultra-high pressure water jet stream alternately mixed with abrasive particles, which wears off the material of the workpiece and hence cuts the material.

The fluid jet cutting system can be used for a wide range of materials, such as metal, glass, composites, rubber, foam, plastics, leather, tile, glass, ceramics, food, paper, etc.

The present invention concerns the waterjet industry and especially concerns different systems for controlling the motion of the fluid jet cutting head.

BACKGROUND

Fluid jet cutting system can be used to cut flat planar workpieces, wherein the fluid jet cutting head of the system is moved over the workpiece. The motion and inclination may be varied for reaching a desired quality of the cut surface. In some known prior art systems the cutting speed is predetermined as a set-point value, indicating the target value of an essential variable of several parameters, wherein the fluid jet cutting head is automatically controlled by the control unit from said predetermined cutting speed. The set-point value of the cutting speed is used for cutting the workpiece with regard to an optimal quality of the cut surface.

However, it has been evident for quite some time that variation in tolerances and used individual water jet cutting machines will imply that the quality of the cut surface may vary despite the predicted feature of determining the cutting speed strictly in advance. This may also be caused by variance in distance between the singular fluid jet cutting head and the workpiece, different quality of eventually used abrasive particles, different individual water pressure, small difference in material quality of the specific workpiece etc. which will produce the actual machined inclination angle or taper.

Current fluid jet cutting systems may also involve drawbacks in that they do not include any optimized control unit and data medium storing program adapted for providing the motion of the fluid jet cutting head corresponding to optimum taper and trail back inclination of the fluid jet cutting head.

SUMMARY OF THE INVENTION

An object of the present disclosure is to provide a fluid jet cutting system comprising a control unit configured to control the motion of a fluid jet cutting head of the system relative a workpiece to be cut.

An object of the present disclosure is to provide a fluid jet cutting system and a method for controlling the motion of a fluid jet cutting head for optimizing the cut surface and process time, which system and method seek to mitigate, alleviate, or eliminate one or more of the above-identified deficiencies in the art and disadvantages singly or in any combination.

Yet a further object is to provide a technology step-change for current fluid jet cutting systems.

The above-mentioned object is obtained by a fluid jet cutting system comprising a control unit configured to control the motion of a fluid jet cutting head of the fluid jet cutting system relative a workpiece to be cut, the control unit is coupled to a fluid jet cutting head drive configured to incline the fluid jet cutting head relative a vertical line, wherein the control unit is configured to operate the motion of the fluid jet cutting head from a predetermined inclination angle value and other operational data; the control unit is configured to automatically adapt the speed of the fluid jet cutting head in accordance with the predetermined inclination angle value.

In such way is achieved that the system takes into account the value of the actual taper angle and/or actual trail back angle depending upon the specific individual fluid jet cutting system and/or the actual material quality of the workpiece to be cut.

Suitably, the other operational data may be dived into at least one fixed variable and into at least one dynamic variable.

Preferably, the fixed variable/–s may include the physical feature of an orifice of the fluid jet cutting head through which the fluid flows and/or the physical characteristics of the used focusing tube and/or used abrasive mesh etc.

Suitably, the dynamic variable/–s may include actual abrasive flow characteristics and/or actual water pressure values and/or actual cutting speed etc.

Preferably, the value of the actual taper angle and/or actual trail back angle is determined from cutting a calibration portion or portion having the same material quality as the material of the workpiece, wherein the cut made in the calibration portion and the cut made in the workpiece being made by one specific fluid jet cutting system.

Suitably, the value of the actual taper angle and/or actual trail back angle is determined from the specific fluid jet cutting head characteristic.

Preferably, the value of the actual taper angle and/or actual trail back angle is determined from other operational data, such as geometric entity, type of material, quality of the material, thickness of the material etc.

Suitably, the value of the actual taper angle and/or actual trail back angle is determined from cutting a calibration portion having the same material quality as the material of the workpiece, wherein the cut made in the calibration portion defines an angular displacement value.

Preferably, the predetermined inclination angle value is determined by a value defined by the actual taper angle and/or actual trail back angle.

In such way, the predetermined inclination angle value serves as a starting parameter used by the control unit executing and operating the motion of the fluid jet cutting head.

Suitably, the control unit is coupled to a human-machine interface.

Preferably, the fluid jet cutting system comprises a high-pressure fluid supply coupled to the fluid jet cutting head.

Suitably, the fluid jet cutting system comprises a mixing-chamber for mixing water and abrasive particles, which mixing-chamber is coupled to the fluid jet cutting head.

Preferably, the fluid jet cutting system comprises a right-angled frame having at least a side configured to carry one end of a bar or axle for rolling and/or sliding movement in a first direction (Y-direction). The bar or axle carries a fluid jet cutting head drive motion system configured to be moved on the bar or axle in a second direction (X-direction) that may be perpendicular to and/or deviates from said first direction.

Suitably, the fluid jet cutting head drive is coupled to the fluid jet cutting head drive motion system.

Preferably, the control unit comprises a CNC controller.

Suitably, the control unit is configured to control a 5-axis motion system.

In such way it is possible to use a primary motion system configured to move the cutting head drive in three directions: Y-axis (back/forth), X-axis (left/right) and Z-axis (up/down) and to use a secondary motion system configured to rotate the fluid jet cutting head around a B-axis and a C-axis of the cutting head drive.

Preferably, the secondary motion system comprises a motion system configured to provide a cone-shaped kinematic model defining a tool center point (TCP).

In such way extensive movements in the X and Y axis of a 5-axis motion system are eliminated.

The TCP is a fixed point in space through which the fluid jet always will pass, independently of the applied angles described above.

Suitably, the cutting head drive is coupled to a robot arm of a robot apparatus.

In such way there is achieved that the system can be applied to multipurpose applications used in e.g. automotive and aerospace industry.

Preferably, the system comprises a calibration portion configured to be cut by said fluid jet cutting head for providing a calibration cut defining the predetermined inclination angle value.

Suitably, the calibration portion may be a calibration portion made of the same material as the material of the workpiece or the calibration portion may be a section of the calibration portion per se or a section of the waste material of the workpiece.

Preferably, the system is configured to make a cut in said calibration portion, manually, semi-automatically or automatically.

In such way is achieved that a cut made in the calibration portion defines an angular displacement value, which angular displacement value is fed to the control unit and which serves as a starting parameter used by the control unit executing and operating the motion of the fluid jet cutting head.

Suitably, the angular displacement value is determined by semi-automatically or automatically measuring the angle between the workpiece face plane and the cut surface plane taken in an imaginary plane oriented perpendicular to the direction of travel of the fluid jet cutting head.

Preferably, the predetermined inclination angle value is determined as an angle defined between a longitudinal axis of the fluid jet cutting head and a vertical line normal to the plane of the workpiece.

Suitably, the predetermined inclination angle value corresponds to a taper angle value and/or a trailback angle value.

Preferably, the operational data may comprise fluid pressure data and/or abrasive medium data and/or fluid jet cutting head data and/or fluid jet cutting focusing tube data and/or sand granular size and/or surface finish requirement data and/or geometric entity data and/or workpiece material quality data and/or workpiece thickness.

In such way is achieved that the speed of the fluid jet cutting head, by means of the control unit, optimally is adapted to the specific material of the workpiece to be cut.

Suitably, the control unit is configured to automatically adapt the speed of the fluid jet cutting head, which speed is performed in a direction of travel of the fluid jet cutting head and which speed is evaluated by the control unit in accordance with the predetermined inclination angle value.

Preferably, the fluid jet cutting head drive is arranged on a support bar coupled to a primary drive arrangement for moving the support bar over the work piece.

The above-mentioned object is also obtained by a method for controlling the motion of a fluid jet cutting head of a fluid jet cutting system comprising a fluid jet cutting head drive and a control unit configured to operate the motion of the fluid jet cutting head from a predetermined inclination angle value and other operational data and to automatically adapt the speed of the fluid jet cutting head in accordance with the predetermined inclination angle value, the method comprises the steps of; cutting a calibration portion having the same material property as the workpiece to be cut; measuring an angular displacement value for determining said predetermined inclination angle value; feeding data regarding the predetermined inclination angle value to the control unit; cutting the workpiece in accordance with said predetermined inclination angle value and other operational data; and automatically adapting the speed of the fluid jet cutting head by means of the control unit in accordance with the predetermined inclination angle value.

Suitably, the step of cutting the work piece is performed in accordance with moving a support bar comprising the fluid jet cutting head drive and coupled to a primary drive arrangement.

The above-mentioned object is also obtained by a fluid jet apparatus of a fluid jet cutting system, comprising a control unit configured to control the motion of a fluid jet cutting head of the system relative a workpiece to be cut, the control unit is coupled to a fluid jet cutting head drive configured to inclination the fluid jet cutting head relative a vertical line, the control unit is configured to operate the motion of the fluid jet cutting head from a predetermined inclination angle value and other operational data; the control unit is configured to automatically adapt the speed of the fluid jet cutting head in accordance with the predetermined inclination angle value, wherein the motion of the fluid jet cutting head is provided by performing the method steps according to the present invention.

The above-mentioned object is also obtained by a data medium storing program adapted for providing a motion of a fluid jet cutting head of a fluid jet apparatus of the present invention, wherein said data medium storing program comprises a program code stored on a medium, which is readable on a computer, for causing the control unit to perform the method steps of: cutting a calibration portion having the same material property as the workpiece to be cut; measuring an angular displacement value for determining said predetermined inclination angle value; feeding data regarding the predetermined inclination angle value to the control unit; cutting the workpiece in accordance with said predetermined inclination angle value and other operational data; and automatically adapting the speed of the fluid jet cutting head by means of the control unit in accordance with the predetermined inclination angle value.

The above-mentioned object is also obtained by a data medium storing program product comprising a program code stored on a medium, which is readable on a computer, for performing the method steps according to the present invention, when a data medium storing program according to the present invention is run on the control unit.

The expression speed of the fluid jet cutting head in the direction of travel is defined as the relative velocity between the fluid jet cutting head and the workpiece face plane of the workpiece it is operating on.

The expression workpiece face plane is defined as the surface of the workpiece that is turned toward the fluid jet cutting head.

The expression angular displacement value is defined as a value of an inclination of a plane of the cut surface, by means of the fluid jet cutting head oriented normal to the workpiece face plane, relative a vertical line being perpendicular to the work piece face seen in a direction transverse to the direction of travel of the fluid jet cutting head. This angular displacement value is used for inclination of the fluid jet cutting so that the inclination of the fluid jet cutting head corresponds with a predetermined inclination angle value or said angular displacement value.

BRIEF DESCRIPTION OF THE DRAWINGS

The present invention will now be described by way of examples with references to the accompanying schematic drawings, of which:

FIG. 1 illustrates a fluid jet cutting system comprising a control unit configured to control the motion of a fluid jet cutting head according to a first example of the present invention;

FIG. 2 illustrates a fluid jet cutting head drive of a fluid jet cutting system according to a second example of the present invention;

FIGS. 3a and 3b illustrate automatically adaptation of the speed of the fluid jet cutting head in accordance with a predetermined inclination angle value defined as a trailback angle according to a third example of a fluid jet cutting system;

DETAILED DESCRIPTION

Figure 4A:
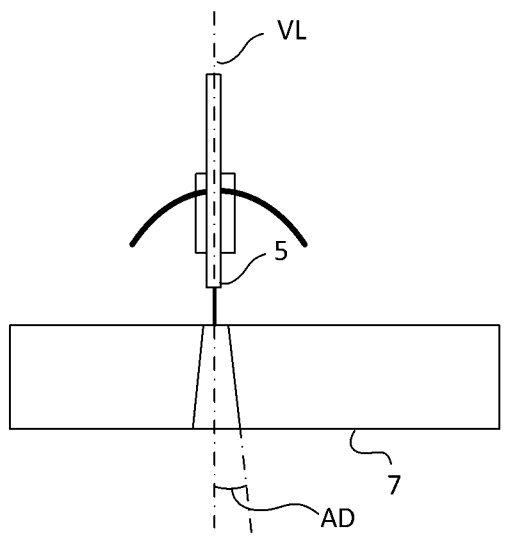
FIGS. 4a to 4c illustrate determination of an angular displacement value for a specific workpiece and individual fluid jet cutting system according to a fourth example of a fluid jet cutting system.

Hereinafter, examples of the present invention will be described in detail with reference to the accompanying drawings, wherein for the sake of clarity and understanding of the invention some details of no importance may be deleted from the drawings.

FIG. 1 illustrates a fluid jet cutting system 1 comprising a control unit 3 configured to control the motion of a fluid jet cutting head 5 according to a first example.

The fluid jet cutting system 1 is configured to control the motion of the fluid jet cutting head 5 of the fluid jet cutting system 1 relative a workpiece 7 to be cut, the control unit 3 is coupled to a fluid jet cutting head drive 9 configured to incline the fluid jet cutting head 5 relative a vertical line VL, wherein the control unit 3 is configured to operate the motion of the fluid jet cutting head 5 from a predetermined inclination angle value PIA (see e.g. FIGS. 3b and 4b) and other operational data; the control unit 3 is configured to automatically adapt the speed of the fluid jet cutting head 5 in accordance with the predetermined inclination angle value PIA. The fluid jet cutting system 1 comprises a calibration portion 11 configured to be cut by said fluid jet cutting head 5 for providing a calibration cut defining said predetermined inclination angle value PIA.

The other operational data may be dived into at least one fixed variable and into at least one dynamic variable, wherein the fixed variable/-s may include the physical feature of an orifice of the fluid jet cutting head through which the fluid flows and/or the physical characteristics of the used focusing tube and/or used abrasive mesh etc.

The dynamic variable/-s may include actual abrasive flow characteristics and/or actual water pressure values and/or actual cutting speed etc.

The calibration portion 11 exhibits the same material quality as the material of the workpiece 7 to be cut. It is preferably one and the same fluid jet cutting system 1 making the calibration cut in the calibration portion 11 that subsequently makes the cut in the workpiece 7.

The predetermined inclination angle value PIA serves as a starting parameter and is fed to the control unit 3. The control unit 3 thereafter executes and operates the motion of the fluid jet cutting head 5 for cutting the workpiece 7 and may comprise a CNC controller 13. The value of the actual predetermined inclination angle PIA may in this example be determined from the individual fluid jet cutting head 5 characteristic and other operational data, such as geometric entity, type of material of the workpiece, quality of the material of the workpiece, thickness of the material of the workpiece, etc. The control unit 3 is coupled to a human-machine interface 15 (e.g. touchscreen interface) and comprises a CAD/CAM Software configured for input/data collection. The CAD/CAM Software is configured to execute input parameters such as the above-mentioned operational data. The control unit 3 and the CAD/CAM Software thus provides a complete software-controlled, multi-axis fluid jet cutting system 1 permitting the flexibility to cut also severe angles and curves (see e.g., FIGS. 4c and 5a). The control unit 3 is configured to initiate one or more functions of the fluid jet cutting system 1, such as starting, stopping, reversing and automatically changing speed from the predetermined inclination angle from a pre-set list of commands.

The fluid jet cutting system 1 may comprise a high-pressure fluid supply 17 that is coupled to the fluid jet cutting head 5. The fluid jet cutting head 5 may in turn be coupled to a mixing-chamber (not shown) for mixing water and abrasive particles.

The high-pressure fluid supply 17 generates a fluid pressure amount that can be adjusted according to the softness, hardness, thickness, qualities and other features of the workpiece 7 material. The adjustment can be performed electronically by input values of the required fluid pressure amount on the human-machine interface 15.

The fluid jet cutting system 1 comprises a right-angled frame 19 having at least a side 21 configured to carry one end 23 of a bar 25 for sliding movement by means of a drive arrangement 27 in a first direction (Y-direction). The bar 25 carries a fluid jet cutting head drive motion system 29 configured to be moved on the bar 25 in a second direction (X-direction) that may be perpendicular to and/or deviates from said first direction. The fluid jet cutting head drive 9 may be coupled to the fluid jet cutting head drive motion system 29. The fluid jet cutting head drive 9 may be arranged on the bar 25, which in turn is coupled to the drive arrangement 27 for moving the bar 25 over the work piece 7. The fluid jet cutting system 1 thus makes use of a fluid jet apparatus 2.

The control unit 3 is configured to control a 5-axis motion system for moving the cutting head drive 9 in three directions: along the Y-axis (back/forth), along the X-axis (left/right) and along a Z-axis (up/down). The 5-axis motion system also configured to rotate the fluid jet cutting head 5 around a B-axis and a C-axis of the cutting head drive 9, whereby there may be provided a cone-shaped kinematic model 31 defining a tool center point (TCP).

An example of a cutting head drive 9 is shown in FIG. 2. The cone-shaped kinematic model 31 defining the tool center point (TCP) eliminates any extensive movements in the X and Y axis of the motion system. The tool center point TCP is a fixed point in space through which a fluid jet will pass independent of inclination of the fluid jet cutting head 9.

The fluid jet cutting system may alternately comprise a robot apparatus (not shown) comprising a robot arm (not shown) on which the fluid jet cutting head 5 is mounted.

Sensor devices (not shown) of the fluid jet cutting system 1 are provided for monitoring the actual motion of the fluid jet cutting head 5 over the workpiece 7. The sensor devices are adapted to sense speed, orientation, proximity to other objects etc. of the fluid jet cutting head 5.

A basic input of the predetermined inclination angle value PIA to the control 3 unit may be provided by sensor data signal generated continuously or sampled successively and reported over time for controlling the fluid jet cutting head 5 over the workpiece 7 and identifying the present position, speed and inclination of the fluid jet cutting head 5.

Other operational data may be dived into at least one fixed variable and into at least one dynamic variable, wherein the fixed variable/-s may include the physical feature of an orifice of the fluid jet cutting head through which the fluid flows and/or the physical characteristics of the used focusing tube and/or used abrasive mesh etc.

The dynamic variable/-s may include actual abrasive flow characteristics and/or actual water pressure values and/or actual cutting speed etc.

FIGS. 3a and 3b illustrate automatically adaptation of the speed S of the fluid jet cutting head 5 in accordance with a predetermined inclination angle value PIA defined as a trailback angle according to a third example of a fluid jet cutting system. FIG. 3a shows an example of a trailback angle TA pattern of the cut surface of the workpiece 7. This pattern may be compensated by tilting the fluid jet cutting head 5 as shown in FIG. 3b. The trailback angle TA may be measured by a measuring device (not shown) on a calibration portion. FIG. 3b shows that the fluid jet cutting head 5 is inclined to an angle (predetermined inclination angle value PIA) corresponding with the trailback angle TA. A control unit (not shown) of the fluid jet cutting system 1 is configured to operate the motion of the fluid jet cutting head 5 from the predetermined inclination angle value PIA and other operational data. The control unit is configured to automatically adapt the speed of the fluid jet cutting head 5 in accordance with the predetermined inclination angle value PIA.

Figure 4B:
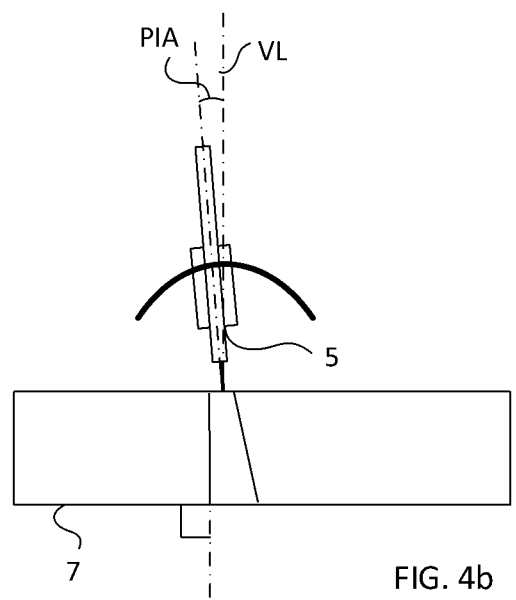
Figure 4C:
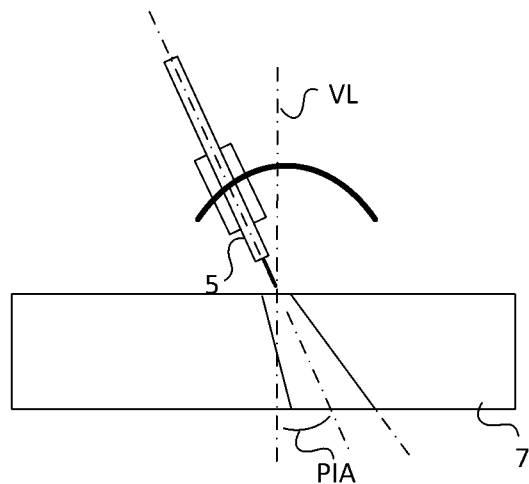

FIGS. 4a to 4c illustrate determination of an angular displacement value AD for a specific workpiece 7 and caused by an individual fluid jet cutting system 1 according to a fourth example of the fluid jet cutting system 1. FIG. 4a shows an example of the angular displacement value AD (taper angle) between the cut surface and the vertical line VL. This taper angle may be compensated by tilting the fluid jet cutting head 5 with an angle (predetermined inclination angle value PIA) corresponding with the taper angle as shown in FIG. 4b. The predetermined inclination angle value PIA serves as a starting parameter and is fed to a control unit (not shown). The control unit thereafter executes and operates the motion of the fluid jet cutting head 5 for cutting the workpiece 7. The value of the actual predetermined inclination angle value PIA may in this example be determined from the individual fluid jet cutting head 5 characteristic and other operational data, such as geometric entity, type of material, quality of the material, thickness of the material, type of abrasive particles, different individual water pressure etc. The operational data thus may comprise fluid pressure data and/or abrasive medium data and/or fluid jet cutting head data and/or fluid jet cutting focusing tube data and/or sand granular size and/or surface finish requirement data and/or workpiece material quality data and/or workpiece thickness etc. The control unit operates the motion of the fluid jet cutting head 5 from the predetermined inclination angle value PIA and automatically adapts the speed of the fluid jet cutting head 5 relative the workpiece 7 in accordance with the predetermined inclination angle value PIA. In FIG. 4c is shown an example of an inclined cut surface wherein the actual taper angle is taken into account for providing a predetermined inclination angle value PIA.

Figure 5A:
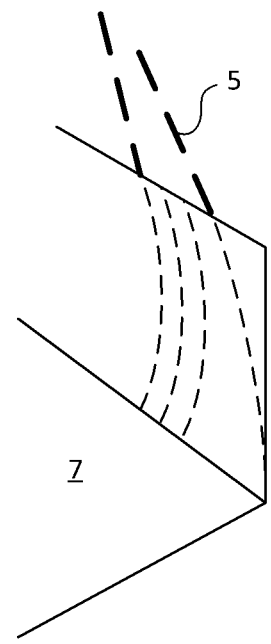
FIGS. 5a to 5d illustrate automatically adaptation of the speed in alteration of the direction of travel of the fluid jet cutting head according to a fifth example of a fluid jet cutting system.
Figure 5B:
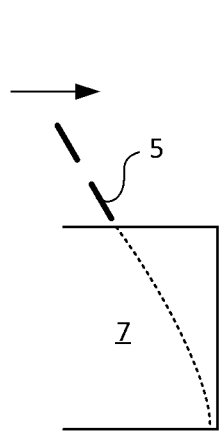
Figure 5C:
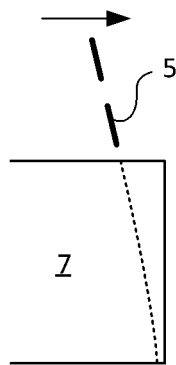
Figure 5D:
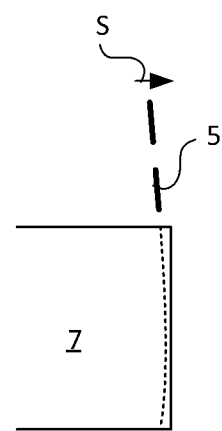

FIGS. 5a to 5d illustrate automatically adaptation of the speed in alteration of the direction of travel of the fluid jet cutting head according to a fifth example of a fluid jet cutting system. FIG. 5a shows a cut made by the fluid jet cutting head 5, wherein the control unit (not shown) automatically adapt the speed of the fluid jet cutting head 5 in accordance with a predetermined inclination angle value. In this example, the cutting head 5 approaches a corner turn and from evaluated inclination of the cutting head the control unit tilts the cutting head even more for cutting material at the lower portion before cutting material at the upper portion of the workpiece 7 to be cut. This is shown schematically in FIGS. 5b and 5c. In FIG. 5d is shown that the speed S is adapted to the predetermined inclination angle value, which has been added with an inclination value suitable for said corner turn by means of the control unit.

Figure 6A:
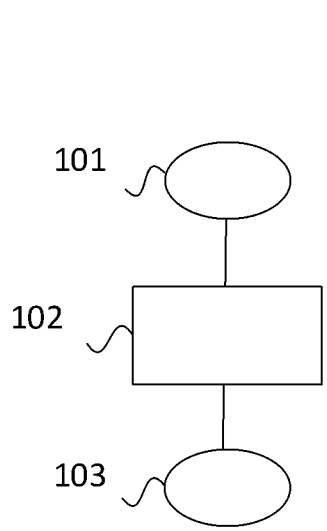
FIGS. 6a and 6b illustrate alternative flowcharts showing exemplary methods for automatically adapting the speed of the fluid jet cutting head by means of the control unit in accordance with the predetermined inclination angle value.
Figure 6B:
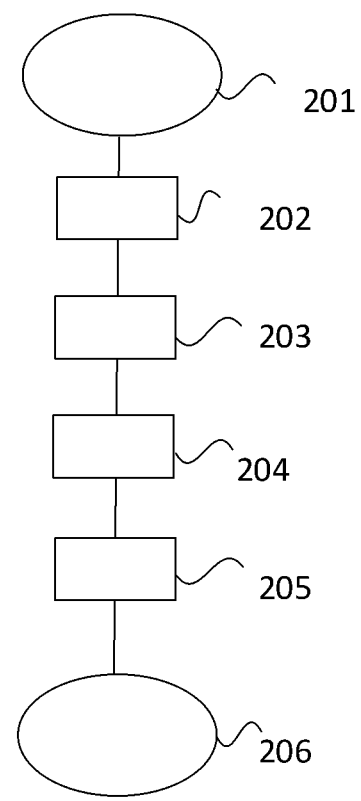

FIGS. 6a and 6b illustrate alternative flowcharts showing exemplary methods for automatically adapting the speed of the fluid jet cutting head of a fluid jet cutting system from a predetermined inclination angle value. The fluid jet cutting system comprises a fluid jet cutting head drive and a control unit configured to operate the motion of the fluid jet cutting head from the predetermined inclination angle value and other operational data and to automatically adapt the speed of the fluid jet cutting head in accordance with the predetermined inclination angle value.

The method shown in FIG. 6a illustrates a first step 101 comprising the start of the method. A second step 102 illustrates a method for providing automatically adaptation of the speed of the fluid jet cutting head over the workpiece in accordance with a predetermined inclination angle value. A third step 103 illustrates a stop of the method. The second step 102 may comprise the steps of; cutting a calibration portion 11 having the same material property as the workpiece 7 to be cut; measuring an angular displacement value AD for determining said predetermined inclination angle value PIA; feeding data regarding the predetermined inclination angle value PIA to the control unit 3; cutting the workpiece 7 in accordance with said predetermined inclination angle value PIA and other operational data; and automatically adapting the speed of the fluid jet cutting head 5 by means of the control unit 3 in accordance with the predetermined inclination angle value PIA.

FIG. 6b illustrates a further example of the method. Step 201 illustrates start of the method. Step 201 shows determining the inclination angle value by using said fluid jet cutting head for cutting a calibration portion having the same material property as the workpiece to be cut. Step 202 shows setting the inclination angle value as said predetermined inclination angle value. Step 203 shows cutting the workpiece using said predetermined inclination angle value relative a vertical line and other operational data. Step 204 shows automatically adapting the speed of the fluid jet cutting head by means of the control unit in accordance with the predetermined inclination angle value. Step 205 shows the step of cutting the work piece is performed in accordance with moving a support bar comprising the fluid jet cutting head drive and coupled to a primary drive arrangement. In Step 206 the method is fulfilled and stopped.

Figure 7:
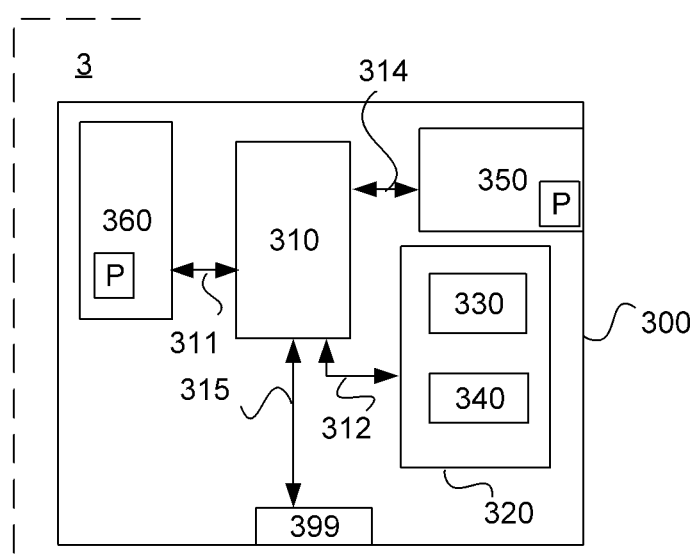
FIG. 7 illustrates a control unit according to different examples of the invention.

FIG. 7 illustrates a CPU device 300 according to different embodiments. The CPU device 300 may be formed in a control unit 3 of a fluid jet cutting system. The control unit 3 is configured to control the motion of a fluid jet cutting head of the system relative a workpiece to be cut. The control unit 3 comprises the CPU device 300 of a computer. The CPU device 300 comprises a non-volatile memory NVM 320, which is a computer memory that can retain stored information even when the computer is not powered. The CPU device 300 further comprises a processing unit 310 and a read/write memory 350. The NVM 320 comprises a first memory unit 330. A computer program (which can be of any type suitable for any operational data) is stored in the first memory unit 330 for controlling the functionality of the CPU device 300. Furthermore, the CPU device 300 comprises a bus controller (not shown), a serial communication left (not shown) providing a physical interface, through which information transfers separately in two directions. The CPU device 300 may comprise any suitable type of I/O module (not shown) providing input/output signal transfer, an A/D converter (not shown) for converting continuously varying signals from detectors (not shown) of the fluid jet cutting system and from other monitoring units (not shown), positioned within the fluid jet cutting system in suitable positions, into binary code suitable for the computer.

The other operational data may be dived into at least one fixed variable and into at least one dynamic variable, wherein the fixed variable/−s may include the physical feature of an orifice of the fluid jet cutting head through which the fluid flows and/or the physical characteristics of the used focusing tube and/or used abrasive mesh etc.

The dynamic variable/−s may include actual abrasive flow characteristics and/or actual water pressure values and/or actual cutting speed etc.

The CPU device 300 also comprises an input/output unit (not shown) for adaptation to time and date. The CPU device 300 also comprises an event counter (not shown) for counting the number of event multiples that occur from independent events in operation of the fluid actuator arrangement. Furthermore, the CPU device 300 includes interrupt units (not shown) associated with the computer for providing a multi-tasking performance and real time computing for automatically adapting the speed of the fluid jet cutting head in accordance with the predetermined inclination angle value.

The NVM 320 also includes a second memory unit 340 for external controlled operation. A data medium storing program P may comprise routines for automatically adapting the speed of the fluid jet cutting head in accordance with the predetermined inclination angle value and is provided for operating the CPU device 300 for performing the method.

The data medium storing program P comprises a program code stored on a medium, which is readable on the computer, for causing the control unit 3 to perform a method for controlling the motion of a fluid jet cutting head of a fluid jet cutting system comprising a fluid jet cutting head drive. The system comprises a control unit configured to operate the motion of the fluid jet cutting head from a predetermined inclination angle value and other operational data and is configured to automatically adapt the speed of the fluid jet cutting head in accordance with the predetermined inclination angle value. The method comprises the steps of; cutting a calibration portion 11 having the same material property as the workpiece 7 to be cut; measuring an angular displacement value AD for determining said predetermined inclination angle value PIA; feeding data regarding the predetermined inclination angle value PIA to the control unit 3; cutting the workpiece 7 in accordance with said predetermined inclination angle value PIA and other operational data; and automatically adapting the speed of the fluid jet cutting head 5 by means of the control unit 3 in accordance with the predetermined inclination angle value PIA.

The data medium storing program P further may be stored in a separate memory 360 and/or in the read/write memory 350. The data medium storing program P, in this embodiment, is stored in executable or compressed data format.

It is to be understood that when the processing unit 310 is described to execute a specific function that involves that the processing unit 310 may execute a certain part of the program stored in the separate memory 360 or a certain part of the program stored in the read/write memory 350.

The processing unit 310 is associated with a data port 399 for communication via a first data bus 315. The non-volatile memory NVM 320 is adapted for communication with the processing unit 310 via a second data bus 312. The separate memory 360 is adapted for communication with the processing unit 310 via a third data bus 311. The read/write memory 350 is adapted to communicate with the processing unit 310 via a fourth data bus 314. The data port 399 is preferably connectable to data links of the fluid jet cutting system. When data is received by the data port 399, the data will be stored temporary in the second memory unit 340. After that the received data is temporary stored, the processing unit 310 will be ready to execute the program code, according to the above-mentioned method. Preferably, the signals (received by the data port 399) comprise information about operational status of the fluid jet cutting system, such as operational status regarding the position of the fluid jet cutting head, the position of the fluid jet cutting head relative the workpiece to be cut. The signals may also comprise information about e.g. operational data regarding fluid pressure data and/or abrasive medium data and/or fluid jet cutting head data and/or fluid jet cutting focusing tube data and/or surface finish requirement data and/or geometric entity data and/or workpiece material quality data and/or workpiece thickness.

According to one aspect, signals received by the data port 399 may contain information about actual positions of the fluid jet cutting head by means of sensor members. The received signals at the data port 399 can be used by the CPU device 300 for controlling and monitoring of the automatically adaptation of the speed of the fluid jet cutting head in accordance with the predetermined inclination angle value.

The signals received by the data port 399 can be used for automatically moving the fluid jet cutting head between two end positions. The signals can be used for different operations of the fluid jet cutting head. The information is preferably measured by means of suitable sensor members of the fluid jet cutting system. The information can also be manually fed to the control unit via a suitable communication device, such as a computer display or touchscreen.

The method can also partially be executed by the CPU device 300 by means of the processing unit 310, which processing unit 310 runs the data medium storing program P being stored in the separate memory 360 or the read/write memory 350. When the CPU device 300 runs the data medium storing program P, suitable method steps disclosed herein will be executed. A data medium storing program product comprising a program code stored on a medium is also provided, which product is readable on the computer, for performing the method steps of: cutting a calibration portion 11 having the same material property as the workpiece 7 to be cut; measuring an angular displacement value AD for determining said predetermined inclination angle value PIA; feeding data regarding the predetermined inclination angle value PIA to the control unit 3; cutting the workpiece 7 in accordance with said predetermined inclination angle value PIA and other operational data; and automatically adapting the speed of the fluid jet cutting head 5 by means of the control unit 3 in accordance with the predetermined inclination angle value PIA, when the data medium storing program P according to the present invention is run on the control unit 3.

The present invention is of course not in any way restricted to the preferred embodiments described above, but many possibilities to modifications, or combinations of the described embodiments, thereof should be apparent to a person with ordinary skill in the art without departing from the basic idea of the invention as defined in the appended claims.

What is claimed is:

1. A fluid jet cutting system, comprising:
    a fluid jet cutting head,
    a fluid jet cutting head drive, and
    a control unit coupled to the fluid jet cutting head drive,
    wherein the control unit is configured to:
    move the fluid jet cutting head relative to a workpiece to be cut,
    incline the fluid jet cutting head to a predetermined inclination angle value (PIA) relative to a vertical line (VL),
    operate the motion of the fluid jet cutting head from the predetermined inclination angle value (PIA) and operational data,
    automatically adapt the speed of the fluid jet cutting head in accordance with the predetermined inclination angle value (PIA),
    wherein the predetermined inclination angle value (PIA) is determined based on an angular displacement value (AD), which is a value defined by cutting a calibration portion to measure an actual taper angle or actual trail back angle, and
    the calibration portion is a piece of material having the same material property as the workpiece to be cut.

2. The system according to claim 1, wherein the predetermined inclination angle value (PIA) is determined as an angle defined between a longitudinal axis of the fluid jet cutting head and a vertical line (VL) normal to the plane of the workpiece.

3. The system according to claim 1, wherein the operational data comprises fluid pressure data or abrasive medium data, fluid jet cutting head data, fluid jet cutting focusing tube data, surface finish requirement data, geometric entity data, workpiece material quality data, workpiece thickness, or a combination of any of the foregoing.

4. The system according to claim 1, wherein the fluid jet cutting head drive is arranged on a support bar coupled to a primary drive arrangement for moving the support bar over the work piece.

5. A method for controlling the motion of the fluid jet cutting head of the fluid jet cutting system according to claim 1, the method comprises the steps of:
    cutting a calibration portion which is a piece of material having the same material property as the workpiece to be cut;
    measuring the angular displacement value (AD) for determining said predetermined inclination angle value (PIA);
    feeding data regarding the predetermined inclination angle value (PIA) to the control unit;
    cutting the workpiece in accordance with said predetermined inclination angle value (PIA) and the operational data; and
    automatically adapting the speed of the fluid jet cutting head by means of the control unit in accordance with the predetermined inclination angle value (PIA).

6. The method according to claim 5, wherein the step of cutting the work piece is performed in accordance with moving a support bar comprising the fluid jet cutting head drive and coupled to a primary drive arrangement.

7. A fluid jet apparatus of the fluid jet cutting system according to claim 1, comprising:
    the fluid jet cutting head,
    a high-pressure fluid supply, and
    a mixing-chamber wherein the motion of the fluid jet cutting head is provided by to perform a method comprising:
    cutting a calibration portion having the same material property as the workpiece to be cut;
    measuring an angular displacement value (AD) for determining said predetermined inclination angle value (PIA);
    feeding data regarding the predetermined inclination angle value (PIA) to the control unit;
    cutting the workpiece in accordance with said predetermined inclination angle value (PIA) and other operational data; and
    automatically adapting the speed of the fluid jet cutting head by means of the control unit in accordance with the predetermined inclination angle value (PIA).

8. A non-transitory data medium storing program (P) adapted for providing a motion of the fluid jet cutting head of the fluid jet apparatus according to claim 7, wherein said data medium storing program (P) comprises a program code stored on the medium, which is readable on a computer, for causing the control unit to perform the method steps of:
    cutting a calibration portion, which is a piece of material having the same material property as the workpiece to be cut;

measuring an angular displacement value (AD) for determining said predetermined inclination angle value (PIA);

feeding data regarding the predetermined inclination angle value (PIA) to the control unit;

cutting the workpiece in accordance with said predetermined inclination angle value (PIA) and the operational data; and automatically adapting the speed of the fluid jet cutting head by means of the control unit in accordance with the predetermined inclination angle value (PIA).

9. A non-transitory data medium storing program (P) comprising a program code stored on the medium, which is readable on a computer, which causes the fluid jet cutting system according to claim 1 to perform the steps of cutting a calibration portion, which is a piece of material having the same material property as the workpiece to be cut;

measuring the angular displacement value (AD) for determining said predetermined inclination angle value (PIA);

feeding data regarding the predetermined inclination angle value (PIA) to the control unit;

cutting the workpiece in accordance with said predetermined inclination angle value (PIA) and the operational data; and automatically adapting the speed of the fluid jet cutting head by means of the control unit in accordance with the predetermined inclination angle value (PIA).

\* \* \* \* \*